(12) United States Patent
Franco et al.

(10) Patent No.: US 8,823,499 B2
(45) Date of Patent: Sep. 2, 2014

(54) ENHANCED POWER SUPPLY UNIT FOR POWERLINE NETWORKS

(75) Inventors: Reuven Franco, Tel-Aviv (IL); Uri Weiss, Herzlia (IL); Pablo Omar Sandoval Silva, San Jose, CA (US); Mileend Gadkari, Fremont, CA (US); Michael Weissman, Danville, CA (US); Amir Kanchuk, Ramat Gan (IL)

(73) Assignee: Sigma Designs Israel S.D.I. Ltd., Tel Aviv (IL)

( * ) Notice: Subject to any disclaimer, the term of this patent is extended or adjusted under 35 U.S.C. 154(b) by 673 days.

(21) Appl. No.: 12/962,187

(22) Filed: Dec. 7, 2010

(65) Prior Publication Data

US 2011/0175712 A1 Jul. 21, 2011

Related U.S. Application Data

(60) Provisional application No. 61/267,112, filed on Dec. 7, 2009.

(51) Int. Cl.
*G05B 11/01* (2006.01)
*G08C 19/16* (2006.01)
*H04M 9/00* (2006.01)
*H04J 1/00* (2006.01)

(52) U.S. Cl.
USPC .......... 340/12.32; 340/12.31; 340/12.35; 340/12.33; 340/12.3; 340/12.39; 455/402; 370/482

(58) Field of Classification Search
USPC .......................... 340/12.35, 12.31
See application file for complete search history.

(56) References Cited

U.S. PATENT DOCUMENTS

| | | | |
|---|---|---|---|
| 5,583,440 A | 12/1996 | Bisher | |
| 6,377,163 B1* | 4/2002 | Deller et al. | 307/2 |
| 6,842,668 B2* | 1/2005 | Carson et al. | 700/286 |
| 2004/0239520 A1* | 12/2004 | Seo | 340/825.71 |
| 2005/0049754 A1* | 3/2005 | Ogawa et al. | 700/275 |
| 2006/0202640 A1* | 9/2006 | Alexandrov | 315/291 |
| 2006/0269001 A1 | 11/2006 | Dawson et al. | |
| 2006/0291575 A1 | 12/2006 | Berkman et al. | |
| 2007/0052531 A1 | 3/2007 | Mathews et al. | |
| 2007/0058732 A1 | 3/2007 | Riedel | |
| 2007/0085696 A1* | 4/2007 | Ha et al. | 340/825.22 |
| 2007/0120953 A1* | 5/2007 | Koga et al. | 348/14.01 |
| 2007/0195823 A1 | 8/2007 | Biegert | |
| 2008/0316004 A1* | 12/2008 | Kiko | 340/310.13 |

* cited by examiner

*Primary Examiner* — Jennifer Mehmood
*Assistant Examiner* — Pameshanand Mahase
(74) *Attorney, Agent, or Firm* — Eitan, Mehulal & Sadot

(57) ABSTRACT

A power unit includes an AC/DC converter for converting VAC input to DC, a zero cross unit for modulating the AC/DC converter output to facilitate zero crossing detection based on the output, and a high pass filter (HPF) for filtering data signals, where the data signals are transmitted and received on the same medium from which the VAC input is received. A method for providing power and data signals from a single powerline source, including receiving incoming VAC in an external power unit, converting the incoming VAC to DC, modulating the DC in accordance with zero crossings from the incoming VAC, filtering the VAC to isolate high frequency data signals, where the data signals are transmitted and received on a same medium from which the incoming VAC is received, and providing the DC, modulated DC, and data signals to an embedded processing unit capable of processing the data signals.

20 Claims, 16 Drawing Sheets

| PARAMETER | CONDITION | PERFORMANCE |
|---|---|---|
| 105 LINE IMPEDANCE | DC TO 1KHz<br>1MHz-30MHz | >10K Ohm (OPEN)<br>>300Ohm (OPEN) |
| DC RESISTANCE (PHASE OR NEUTRAL TO GROUND) | DC TO 10KHz<br>1MHz-30MHz | ≥5MOhms |
| 105 INSERTION LOSS TO HPAV PORT | 1.7MHz-30MHz | <=1dB |
| HPAV SIGNAL STRENGTH | +17dBm | NO COMPONENT OR SIGNAL SATURATION |
| AC/DC INTERNAL NOISE PORT ISOLATION | 1MHz-30MHz | <-150dBm/Hz |

| PARAMETER | CONDITION | PERFORMANCE |
|---|---|---|
| 105' LINE IMPEDANCE | 1MHz-30MHz | >300ohm (OPEN) |
| DC RESISTANCE (+ OR - GROUND) | DC TO 10KHz 1MHz-30MHz | ≥5MOhms |
| 105' INSERTION LOSS TO HPAV PORT | 1MHz-30MHz | <=1dB |
| HPAV SIGNAL STRENGTH | +17dBm | NO COMPONENT OR SIGNAL SATURATION |
| DC & ZC INTERNAL NOISE PORT ISOLATION | 1MHz-30MHz | <-150dBHz |

| PARAMETER | CONDITION | PERFORMANCE |
|---|---|---|
| 105' LINE IMPEDANCE | DC-10KHz<br>1MHz-30MHz | (PS)<br>>50Ohm |
| DC RESISTANCE<br>(+ OR - TO GROUND) | 1MHz-30MHz | ≥5 MOhms |
| 105' INSERTION LOSS TO<br>DC & ZC PORT<br>HPAV PORT | DC TO 100Hz<br>1MHz-30MHz | <=0.5dB<br><=1dB |
| HPAV LINE IMPEDANCE | 1MHz-30MHz | <500 Ohm (OPEN) |
| HPAV SIGNAL STRENGTH | +17dBm | NO COMPONENT OR<br>SIGNAL SATURATION |
| DC/(ZC) INTERNAL NOISE<br>PORT ISOLATION | 1MHz-30MHz | <-150dBHz |

ENHANCED POWER SUPPLY UNIT FOR POWERLINE NETWORKS

CROSS-REFERENCE TO RELATED APPLICATIONS

This application claims benefit from U.S. Provisional Patent Application No. 61/267,112, filed Dec. 7, 2009, which is hereby incorporated in its entirety by reference.

FIELD OF THE INVENTION

The present invention relates to power supply units generally and to their use for powerline network devices in particular.

BACKGROUND OF THE INVENTION

Residential gateways or set top boxes (STBs) that are used to configure and manage data communications networks often have external power units, where the power supply or at least one or more of its components is located in an external unit. Such external units typically comprise a plug-in adapter (or AC adapter) used to convert the alternating current (AC) electricity received from the mains to the direct current (DC) electricity used to power the adapters.

Locating this functionality in an external unit provides a number of advantages, such as: reducing heat build-up in the STB, reducing the size of the STB, and enabling the separate configuration and/or certification of the external power unit as necessary for compliance with specific power supply requirements and regulations without having to reconfigure the main unit.

However, external power supplies are somewhat problematic for HPAV network STBs. Such networks can be configured to transmit data over an existing powerline infrastructure typically found in a home or small office. Accordingly, in such networks the data is transmitted over the same medium as the power to run the STB. The external power unit must therefore be configured to provide both DC voltage to the STB and pass HPAV data on a high frequency AC signal (1.7-30 MHZ).

PCT Patent Publication 2007/016031 assigned to the common assignees of the present invention and hereby included in its entirety by reference, discloses a method for using powerline phases to synchronize the scheduling of data transmission on a powerline network. As disclosed in PCT Patent Publication 2007/016031, such powerline phases are defined according to zero cross points of AC current at a low frequency (typically 50-60 Hz). Accordingly, a powerline HPAV network STB also requires low frequency AC input from which powerline phases can be determined.

Therefore, in order to operate, an HPAV STB requires three types of electrical input: DC voltage to operate the unit itself, very low frequency (50-60 Hz) AC voltage to enable zero crossing detection on the mains outlet AC cycle, and high frequency (1.7-30 MHZ) for the HPAV/G.hn data signal.

SUMMARY OF THE INVENTION

There is provided, in accordance with a preferred embodiment of the present invention, a power unit including an AC/DC converter to at least convert VAC input to DC, a zero cross unit to modulate the AC/DC converter output to facilitate zero crossing detection based on the output, and at least one high pass filter (HPF) to at least filter data signals, wherein the data signals are transmitted and received on the same medium from which the VAC input is received.

Further, in accordance with a preferred embodiment of the present invention, the power unit is housed in an external unit connectable to an embedded unit capable of processing the data signals.

Still further, in accordance with a preferred embodiment of the present invention, the embedded unit is at least one of a set top box (STB) and a residential gateway.

Additionally, in accordance with a preferred embodiment of the present invention, at least one of the AC/DC converter, the zero cross unit and the high pass filter is housed in a device including means for processing the data signals; and at least one of the AC/DC converter, the zero cross unit and the high pass filter are located external to the device.

Moreover, in accordance with a preferred embodiment of the present invention, the power unit also includes: a single pair wiring to output at least low frequency DC power and high frequency data signals; and means for outputting at least an indication of an AC zero crossing, where the means are at least one of a third wire that is suitable to be wrapped together with the single pair in a triple wire interface, where the indication is in the form of low frequency signals modulated in accordance with a zero crossing characteristic, and the single pair wiring, where the indication is in the form of the low frequency DC power signal modulated in accordance with the zero crossing characteristic.

Further, in accordance with a preferred embodiment of the present invention, the data signals are one of HPAV and G.hn signals.

Still further, in accordance with a preferred embodiment of the present invention, the power unit also includes at least one low pass filter to facilitate input of low frequency AC signals to at least one of the AC/DC converter and the zero cross isolation unit.

Additionally, in accordance with a preferred embodiment of the present invention, the power unit also includes: a triple wire input to receive the VAC input, where a first combination of two wires of the triple wire input are branched to provide input to the AC/DC converter and the at least one HPF; and a second HPF to receive input from a second combination of two wires branched from the triple wire input.

Moreover, in accordance with a preferred embodiment of the present invention, the power unit also includes: a first single pair wiring to output at least low frequency DC power and high frequency data signals input from the first combination, a second single pair wiring to output at least the high frequency data signals from the second combination, and means for outputting at least an indication of an AC zero crossing, where the means are at least one of a dedicated wire, where the indication is in the form of low frequency AC signals, and the first single pair wiring, where the indication is the low frequency DC power signal modulated in accordance with the zero crossing characteristic.

There is also provided, in accordance with a preferred embodiment of the present invention, a method for providing power and data signals from a single powerline source includes: receiving incoming VAC in an external power unit, converting the incoming VAC to DC, modulating the DC in accordance with zero crossings from the incoming VAC, filtering the VAC to at least isolate high frequency data signals, where the data signals are transmitted and received on a same medium from which the incoming VAC is received, and providing the DC, the modulated DC and the data signals to an embedded processing unit capable of processing the data signals.

Further, in accordance with a preferred embodiment of the present invention, at least one of the converting, the modulating and the filtering is performed in an external power unit.

Still further, in accordance with a preferred embodiment of the present invention, at least one of the converting, the modulating and the filtering is performed in the processing unit.

Additionally, in accordance with a preferred embodiment of the present invention, the providing includes outputting the zero crossing signals on a dedicated wire.

Moreover, in accordance with a preferred embodiment of the present invention, the method also includes modulating the DC in accordance with the zero crossing signals.

Further, in accordance with a preferred embodiment of the present invention, the method also includes: receiving the data signals from the embedded processing unit, and transmitting them via the single powerline source.

Still further, in accordance with a preferred embodiment of the present invention, the providing is via single pair wiring.

Additionally, in accordance with a preferred embodiment of the present invention, the providing is via a triple wire interface.

Moreover, in accordance with a preferred embodiment of the present invention, the filtering includes: generating at least two wiring pairs from a three wire prong input, and isolating the data signals for each of the wiring pairs to provide at least one of expanded bandwidth and data redundancy.

Further, in accordance with a preferred embodiment of the present invention, the providing comprises outputting at least an indication of an AC zero crossing via at least one of modulated DC on a dedicated wire, and a single pair wiring with the data signals and modulated, low frequency DC power.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
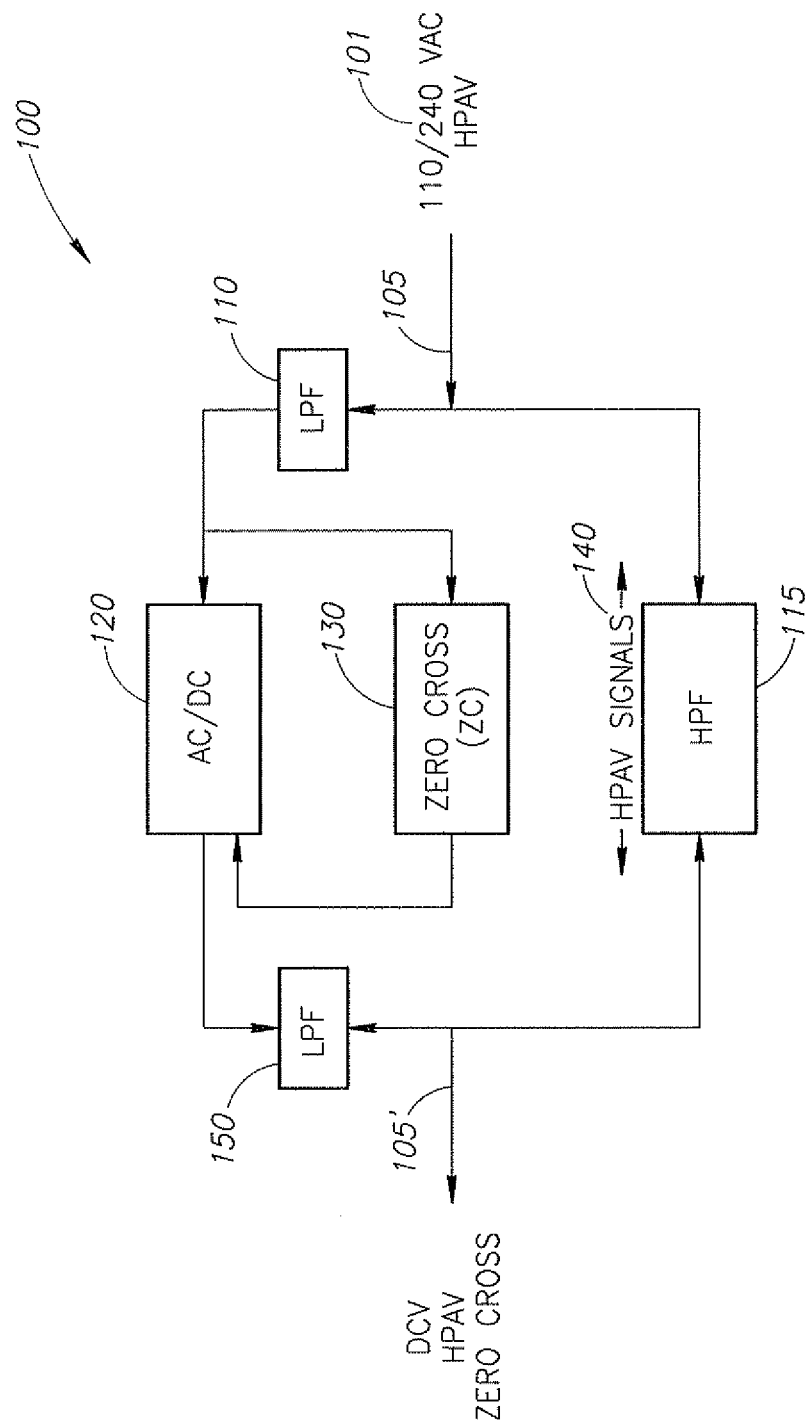
FIG. 1 is a schematic illustration of a novel power unit, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1 which illustrates a block diagram for a novel external power unit 100 for a powerline STB, constructed and operative in accordance with a preferred embodiment of the present invention. Power unit 100 may comprise an AC/DC converter unit 120 and a zero cross isolation unit 130. Single pair input wiring 105 may carry standard 110/240 VAC voltage 101 (including HPAV signals) from the electric mains. Single pair output wiring 105' may provide the STB (not shown) with HPAV signals 140 along with modulated DC voltage that may, as will be hereinbelow described, be used by the STB to emulate AC zero detection. It will be appreciated that the depiction of wirings 105 and 105' as single pair wires may be exemplary. As will be discussed hereinbelow, the present invention may also include embodiments wherein one or both of wirings 105 and 105' may be implemented with three wire schemes for phase, neutral and ground.

In operation, signals on wiring 105 may pass through low pass filter 110 and high pass filter 115. Low pass filter 110 may filter out higher frequencies, while high pass filter 115 may filter out lower frequencies. The signals that successfully pass through low pass filter 110 may be fed to AC/DC converter unit 120 and zero cross detection unit 130.

Zero cross detection unit 130 may comprise an opto coupler that may produce a 50 Hz AC cycle to be fed to the AC/DC converter unit 120. The signal may be fed to an adjustable shunt in the power adaptor. In such manner, the DC power output by unit 120 may be modulated by the input zero cross signal to emulate the AC phases as may be defined by the AC zero crossing. The modulated DC signals may then pass through low pass filter 150 to remove any residual high frequency signal.

HPAV signals 140 may pass through high pass filter 115. The signals passing through filters 150 and 115 may then be carried together on a single pair wiring 105' to the STB.

It will be appreciated that unit 100 may also be configured to return HPAV signals 140 from the STB to the electric mains. Unlike the DC power and zero crossing indications that may flow only towards the STB, HPAV signals 140 may be assumed to be bi-directional, i.e. moving in both directions. Accordingly, HPAV signals 140 may also flow from the STB via wiring 105' through HPF 115, and out to the source of VAC 101 via wiring 105. It will further be appreciated that the designation of such signals as "HPAV" may be exemplary; the present invention may be sufficiently robust to include any powerline based signal.

Figure 2A:
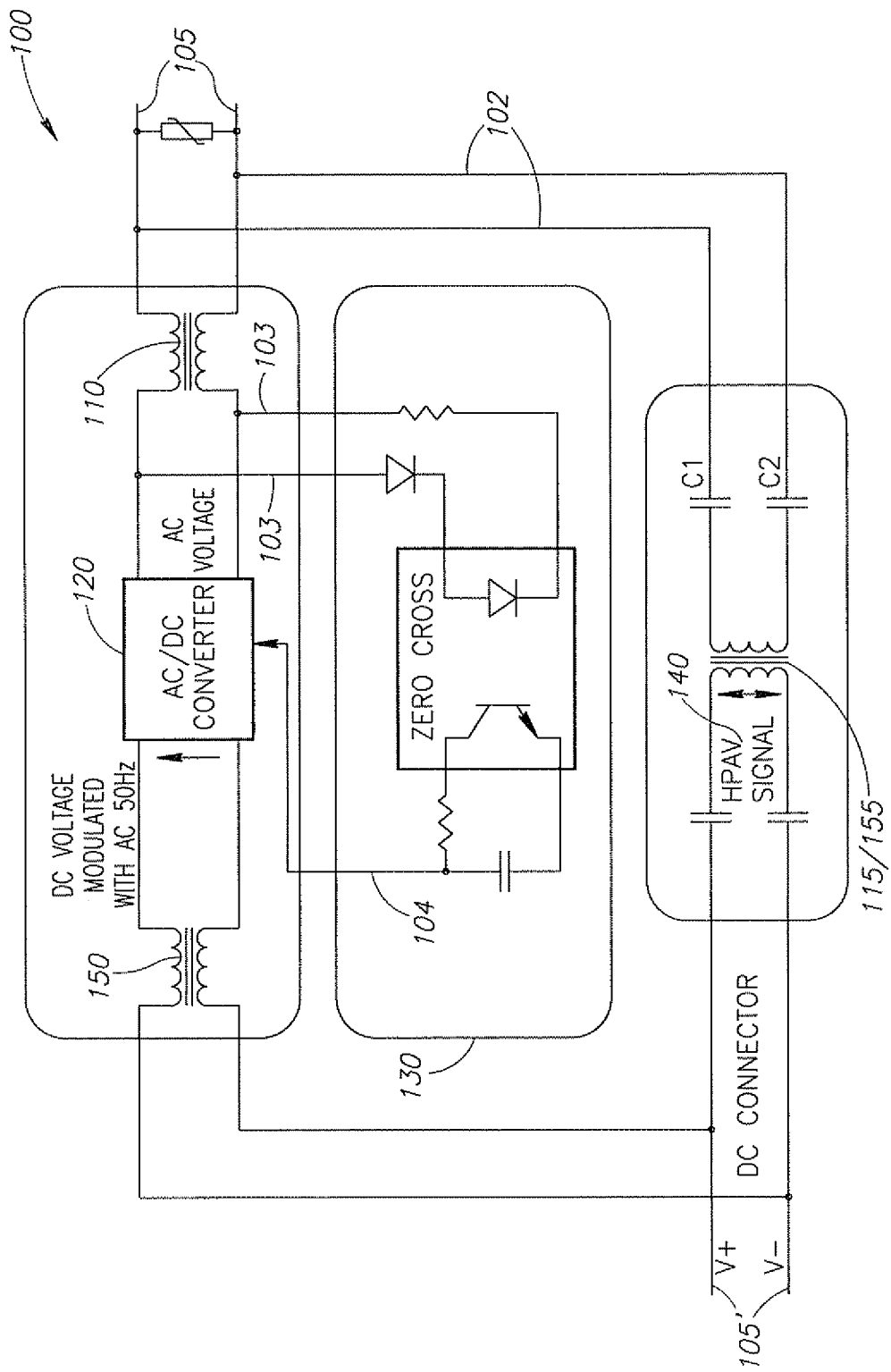
FIG. 2A is a schematic illustration of an exemplary electrical wiring diagram for the power unit of FIG. 1.
Figure 2B:
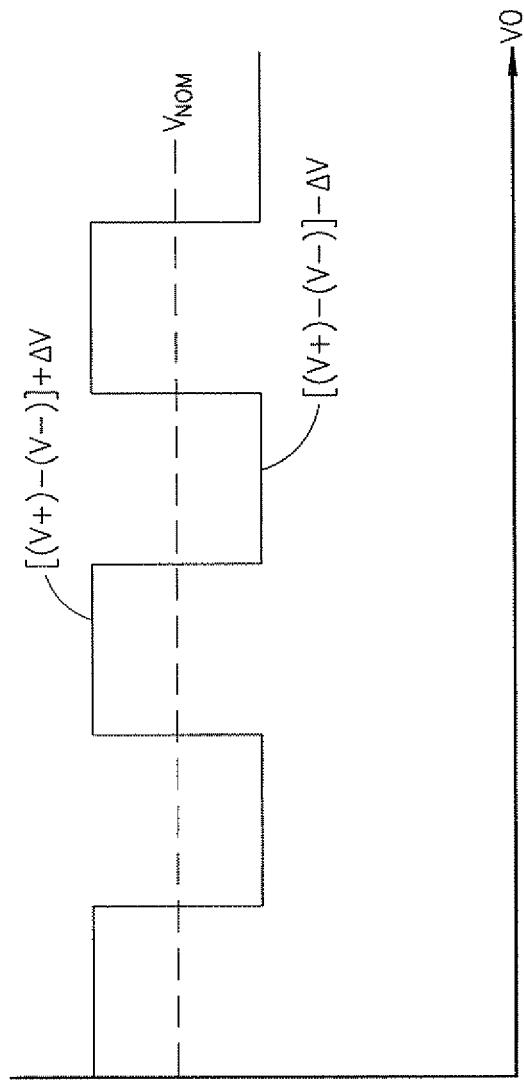
FIG. 2B is a schematic illustration of an exemplary representation of modulated DC voltage as may be produced by the system of FIGS. 1 and 2A.

FIG. 2A, to which reference is now made, illustrates an exemplary wiring diagram for the embodiment of FIG. 1; like numerals may refer to similar elements in both figures. Single pair wiring 105 may carry AC current from the electric mains. Single pair wiring 102 may be split off from wiring 105 to provide input for high pass filter 115. It will be appreciated that it may not be necessary to implement HPF 115 and 155 separately; a single high pass filter may be used to provide the required functionality as discussed hereinabove in the context of FIG. 1. After the AC current passes through low pass filter 110, single pair wiring 103 may be split off for input to zero cross isolation unit 130. The low frequency AC current from unit 130 may be input to converter 120 via single pair wiring 104 to provide modulated DC current. FIG. 2B, to which reference is now briefly made, illustrates an exemplary representation of DC voltage as may be produced by system 100. $V_0$ may represent zero voltage and Vnom may represent the nominal voltage without modulation, as defined by $[(V_+)-V_-)]$. $\Delta V$ may represent the contribution of the modulation to the nominal voltage. Accordingly, the modulated voltage may alternate between (Vnom+$\Delta V$) and (Vnom−$\Delta V$), instead of a generally stable, Vnom.

Figures 3, 4:
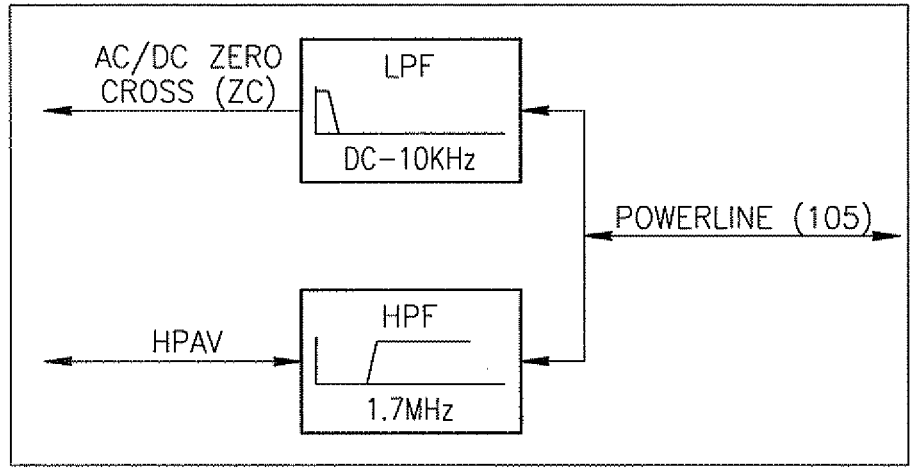
FIGS. 3 and 5 are schematic illustrations of preferred exemplary input and output filters architectures for the power unit of FIG. 1.
FIGS. 4 and 6 are tables of electrical requirements for the architectures of FIGS. 3 and 5, respectively.

Reference is now made to FIG. 3 which illustrates a preferred exemplary input filters architecture for external unit 100. The powerline port may represent wiring 105 from FIG. 1 and may be assumed to comprise 110-240 VAC and HPAV signals. The electrical requirements for this port may be as shown in FIG. 4, to which reference is now also made.

Figures 5, 6:
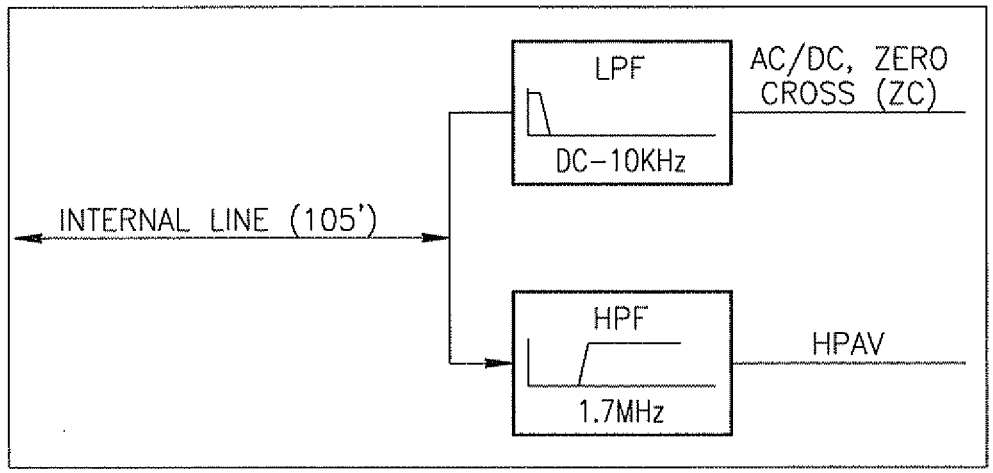

Reference is also made to FIG. 5 which illustrates a preferred exemplary output filter architecture for external unit 100. The internal line port may represent wiring 105' from FIG. 1 and may be assumed to comprise VDC, HPAV signals & Zero Cross indications. The electrical requirements for the output filter of external unit 100 may be as shown in FIG. 6, to which reference is now also made.

In accordance with a preferred exemplary embodiment of the present invention, the following guidelines may be followed for implementing unit 100: Capacitors in front of the HPAV signal in transceiver 140 may be safety capacitors. The Zero Cross Opto coupler and HPAV transformers may pass an electrical strength test of 3 KV AC and 4.242 VDC and may be UL approved. Preferably, all components (common mode, inductors, transformers, capacitors, etc.) on the primary side may be UL approved. A minimum of 6.4 mm creepage and 4.4 mm clearance may be recommended between Primary (High Voltage Area) to Secondary Circuit (Low Voltage Area). The HPAV transformer may be designed properly to be a safety transformer and UL approved. It will be appreciated that the DC voltage out of the external power unit may require readjustment to reflect the updated DC circuit mechanism and/or to supply the proper value into the Embedded Unit.

Figure 7:
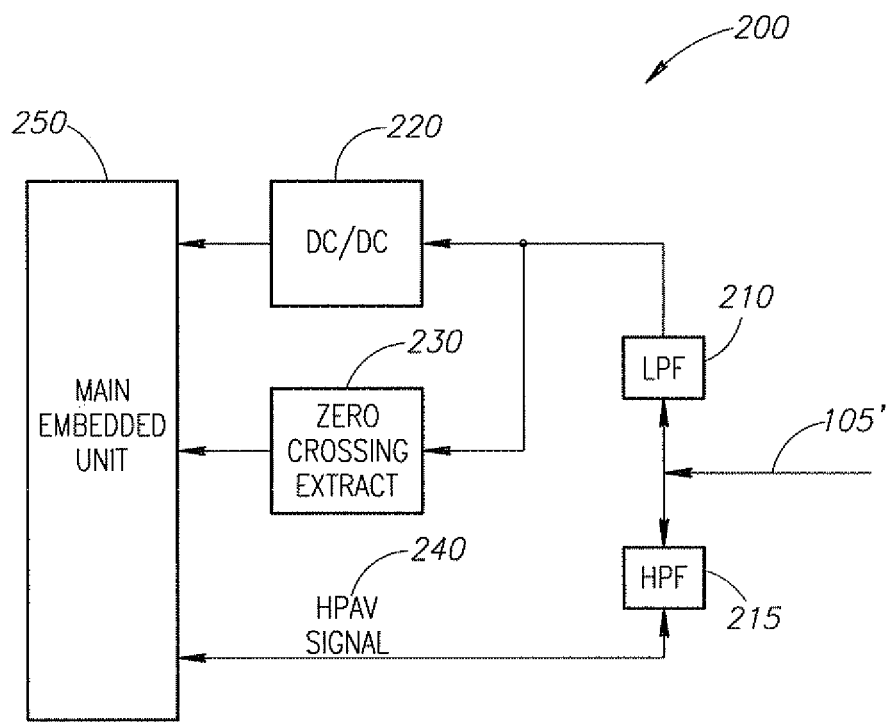
FIG. 7 is a schematic illustration of a novel embedded power unit to communicate with the power unit of FIG. 1.

An embedded unit may be added to the STB itself to communicate with unit 100. FIG. 7, to which reference is now made, illustrates a block diagram for a novel embedded unit 200, constructed and operative in accordance with a preferred embodiment of the present invention. Unit 200 may comprise main embedded unit 250 to provide STB functionality. Unit 200 may also comprise DC/DC power supply 220 and zero cross extractor 230. HPAV signals 240 may be received from unit 100 via wiring 105'. It will be appreciated that the implementation of unit 200 providing STB functionality may be exemplary. The present invention may also include unit 200 providing other relevant functionality, such as, for example, a residential gateway (RG).

In operation, input from wiring 105' may be filtered by low pass filter 210 and high pass filter 215. Low frequency signals passing through low pass filter 210 may continue to DC/DC power supply 220 and zero crossing extractor 230. Power supply 220 may be any suitable power supply capable of providing DC current as required to power main embedded unit 250. For example, DC/DC power supply may convert the incoming power current to 12 volts. Extractor 230 may extract zero cross timing information from the input AC current and forward it to main embedded unit 250 where it may be used for synchronizing the timing of the HPAV network. Signals 240 passing through high frequency filter 215 may be forwarded from a transceiver interface unit to main embedded unit 250.

Figure 8:
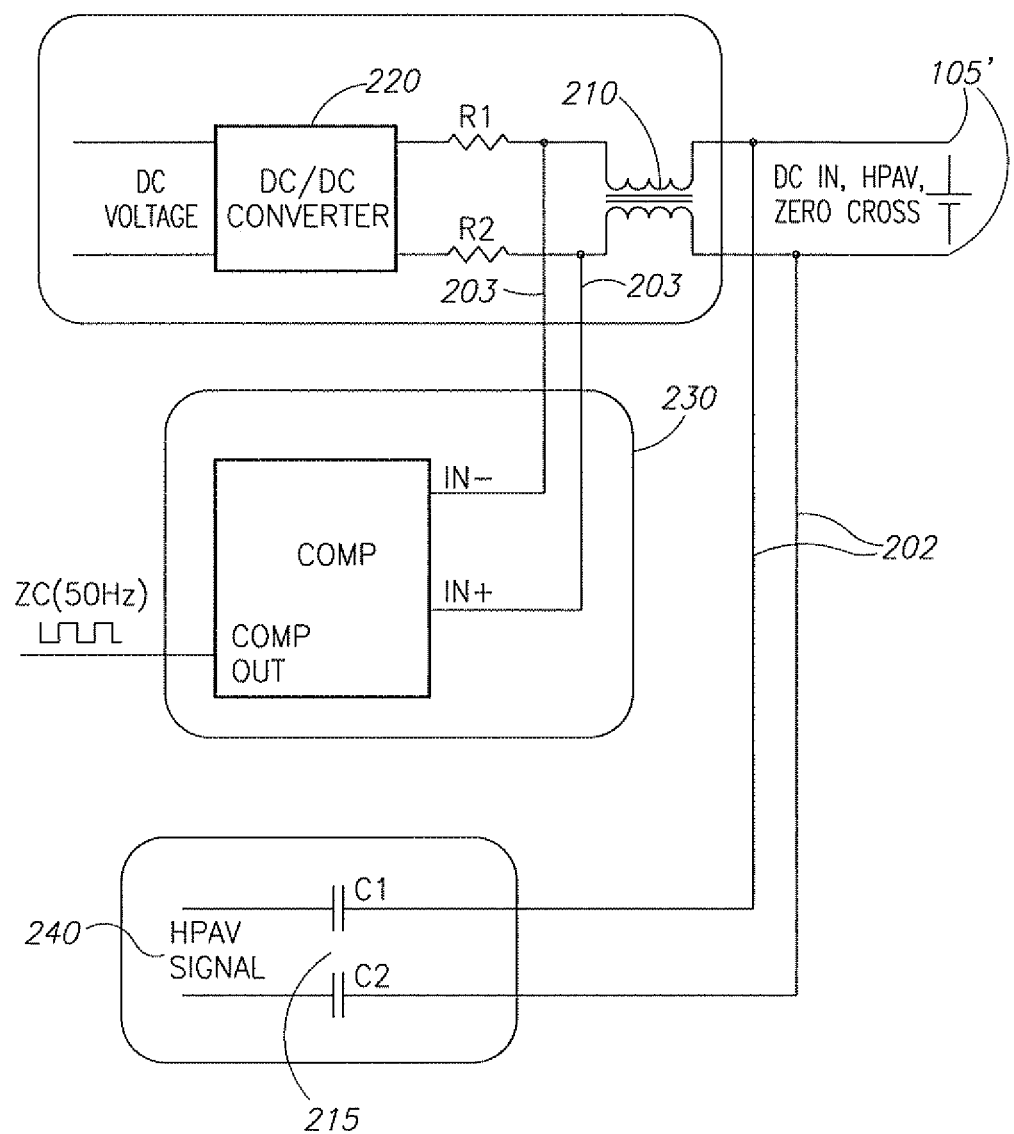
FIG. 8 is a schematic illustration of an exemplary electrical wiring diagram for the power unit of FIG. 7.

FIG. 8, to which reference is now made, illustrates an exemplary wiring diagram for the embodiment of FIG. 7; like numerals may refer to similar elements in both figures. Single pair wiring 105' may provide input from unit 100. Single pair wiring 202 may split off from wiring 105' to provide input to unit 215. High frequency HPAV signals 240 may proceed to unit 250 (not shown) via high pass filter 215.

Signals from wiring 105' may also pass through low frequency filter 210. Single pair wiring 203 may split off from wiring 105' to provide low frequency AC input to zero cross detection unit 230. Unit 230 may compare the input IN+ and IN−signals to output a demodulated 50 HZ signal suitable for zero cross processing.

Figures 9, 10:
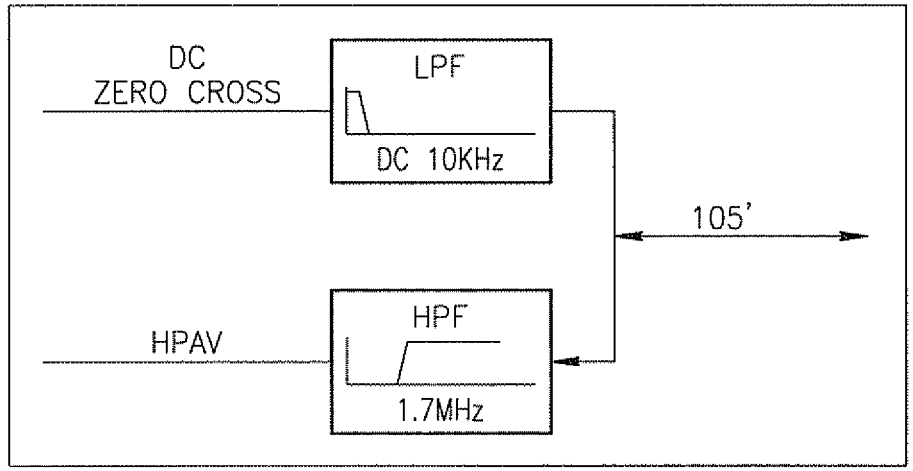
FIG. 9 is a schematic illustration of a preferred exemplary input filter architectures for the power unit of FIG. 7.
FIG. 10 is a tables of electrical requirements for the architectures of FIG. 9.

Reference is now made to FIG. 9 which illustrates a preferred exemplary input filters architecture for embedded unit 200. 105' may represent the wiring interface with system 100 and may be assumed to comprise VDC, HPAV signal and Zero Cross signals. The electrical requirements for input filters of embedded unit 200 may be as shown in FIG. 10, to which reference is now also made.

Applicants have also realized that an alternate solution for zero cross indication may be implemented without modulating the DC signals. An AC/DC converter typically includes a low pass filter (large capacitor) to filter out residual AC signals. In accordance with a preferred embodiment of the present invention, this filter may be implemented as part of the STB, instead of in the AC/DC converter. In such an embodiment, for the AC/DC converter may substantially include a full wave rectification such that the zero crossing information may be embedded in its output signals.

Figure 11:
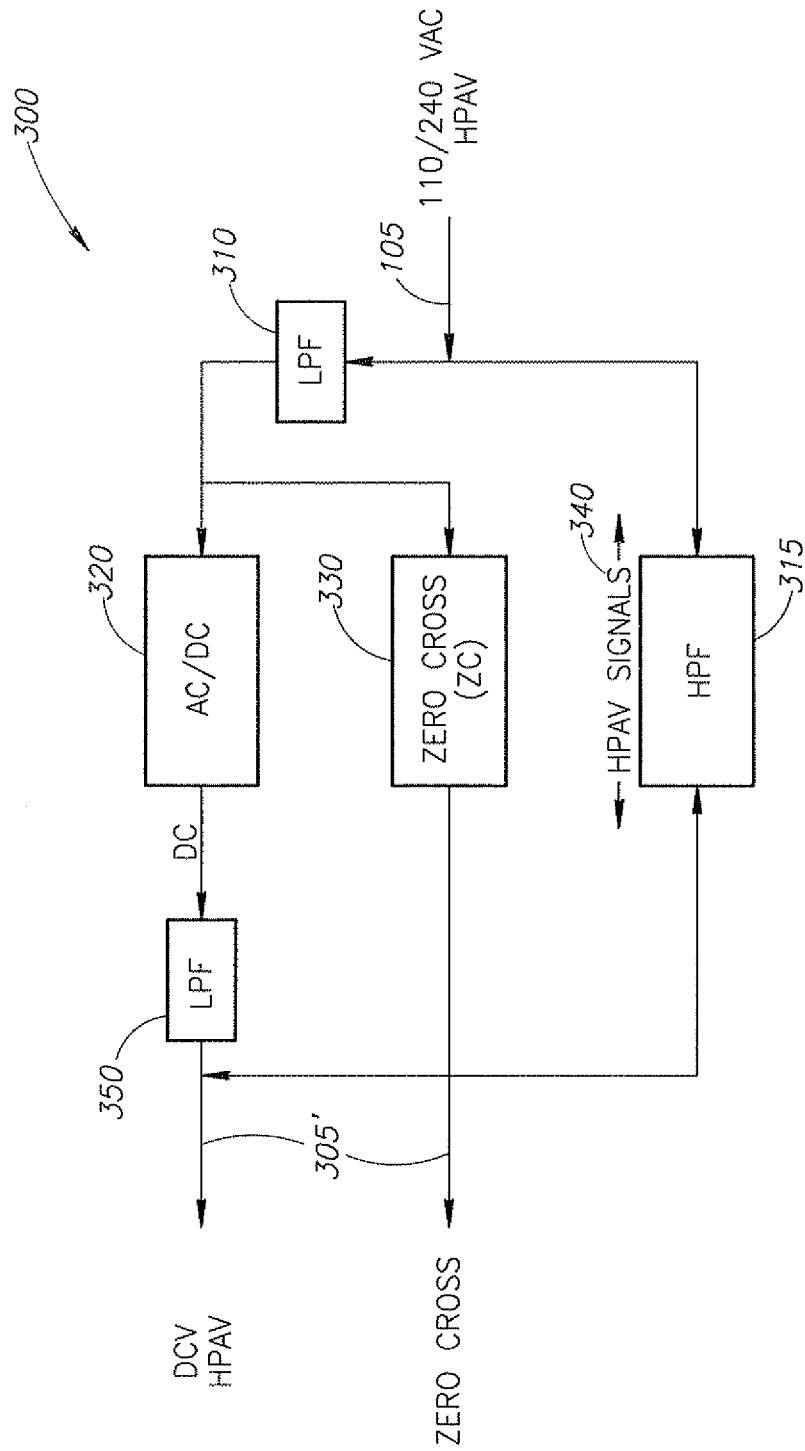
FIG. 11 is a schematic illustration of a novel triple wire interface power unit, constructed and operative in accordance with a preferred embodiment of the present invention.

Applicants further realize that the connection from the external power unit to the STB may be via a three wire interface. FIG. 11, to which reference is now made, illustrates a block diagram for a novel triple wire external power unit for a powerline STB 300, constructed and operative in accordance with a preferred embodiment of the present invention. Power unit 300 may comprise an AC/DC converter unit 320 and a zero cross isolation unit 330. Single pair wiring input 105 may carry standard 110/240 VAC voltage (including HPAV signals) from the electric mains. Triple wire output wiring 305' may provide the STB (not shown) with HPAV signals 340 along with modulated DC voltage that may, as will be hereinbelow described, be used by the STB to emulate AC zero detection.

Figure 12:
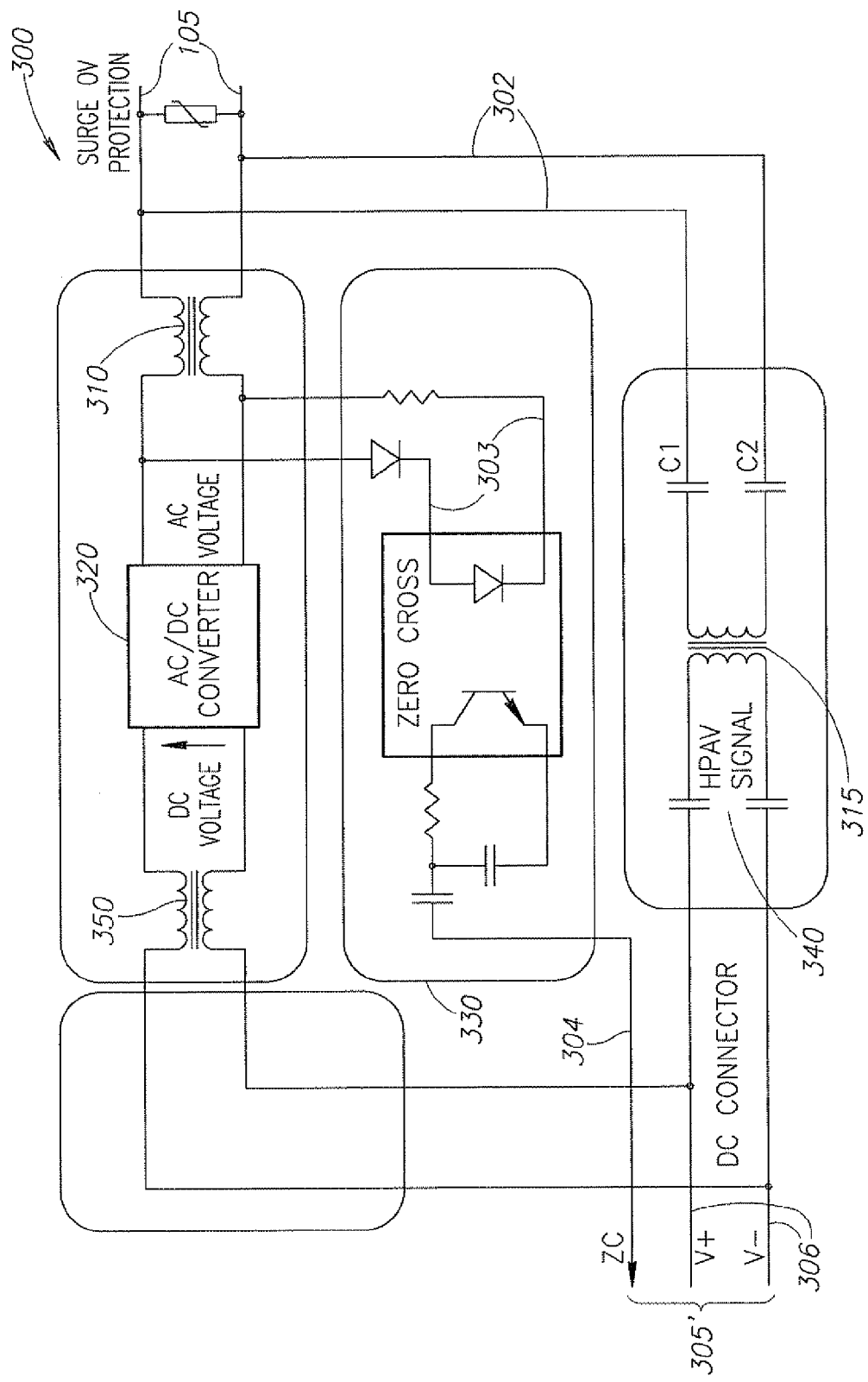
FIG. 12 is a schematic illustration of an exemplary electrical wiring diagram for the power unit of FIG. 11.

FIG. 12, to which reference is now made, illustrates an exemplary wiring diagram for the embodiment of FIG. 11; like numerals may refer to similar elements in both figures.

Similar to the embodiment of FIG. 2, single pair wiring 105 may carry AC current from the electric mains. Single pair wiring 302 may be split off from wiring 105 to provide input for high pass filter 315, resulting in HPAV signals 340. After the AC current passes through low pass filter 310, single pair wiring 303 may be split off for input to zero cross isolation unit 330. The output from converter 320 may pass through low pass filter 350 to reject common mode signals relative to ground before merging with the HPAV signals 340 output from filter 315 to produce single pair wiring 306. Unlike the embodiment of FIG. 2A, the low frequency AC current from unit 330 may not be input to converter 320. Instead, the extension of single wire 304 may be wrapped together with single pair 306 to produce triple wire output wiring 305'. It will be appreciated that the use of single pair wiring 105 as input to unit 300 may be exemplary; as will be further discussed hereinbelow, the present invention may also be implemented to accommodate triple wire input as well.

Figure 13:
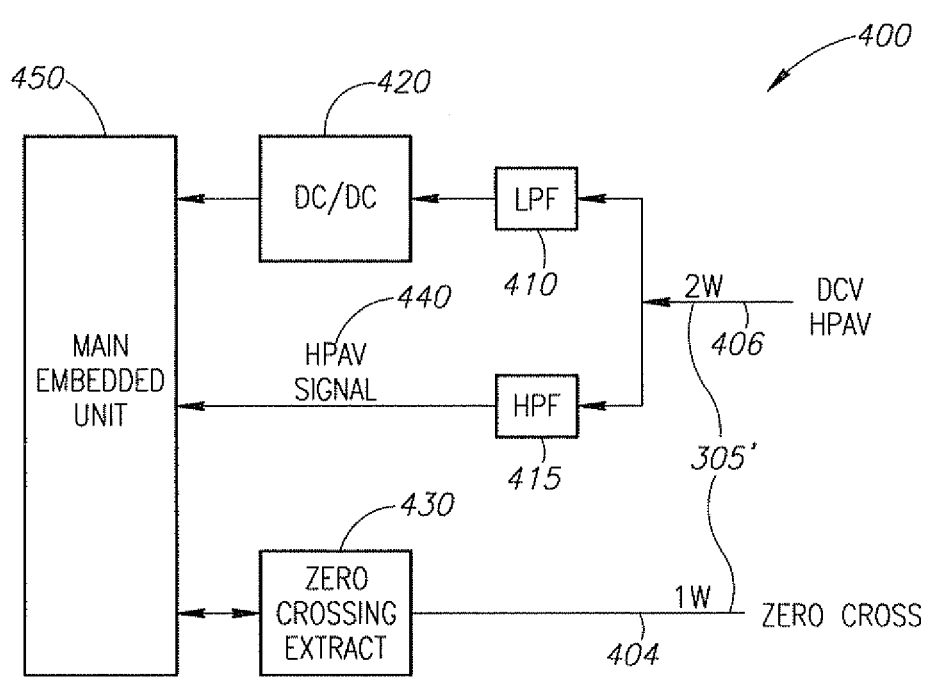
FIG. 13 is a schematic illustration of a novel embedded power unit to communicate with the power unit of FIG. 11.

FIG. 13, to which reference is now made, illustrates a block diagram for a novel embedded unit 400 to communicate with unit 300, constructed and operative in accordance with a preferred embodiment of the present invention. Similar to unit 200, unit 400 may comprise main embedded unit 450 to provide STB functionality. Unit 400 may also comprise DC/DC power supply 420 and zero cross extractor 430. It will be appreciated that the implementation of unit 400 providing STB functionality may be exemplary. The present invention may also include unit 400 providing other relevant functionality, such as, for example, an HPAV network adapter.

In operation, wiring 305' may branch into single pair wiring 406 and single wire 404. Single pair wiring 406 may be connected to single pair wiring 306 carrying low frequency DC and high frequency HPAV signals as described hereinabove. Wiring 406 may branch by passing through low pass filter 410 and high pass filter 415. Low frequency signals passing through low pass filter 410 may continue to DC/DC power supply 420. Power supply 420 may provide DC current as required to power main embedded unit 450. HPAV signals 440 passing through high frequency filter 415 may be forwarded to main embedded unit 450. Unlike the embodiment of FIG. 3, single wire 404 may be assumed to have low frequency AC signals for zero cross detection. Accordingly it may be passed directly to unit 450 via unit 430 without passing through a filter.

Figure 14:
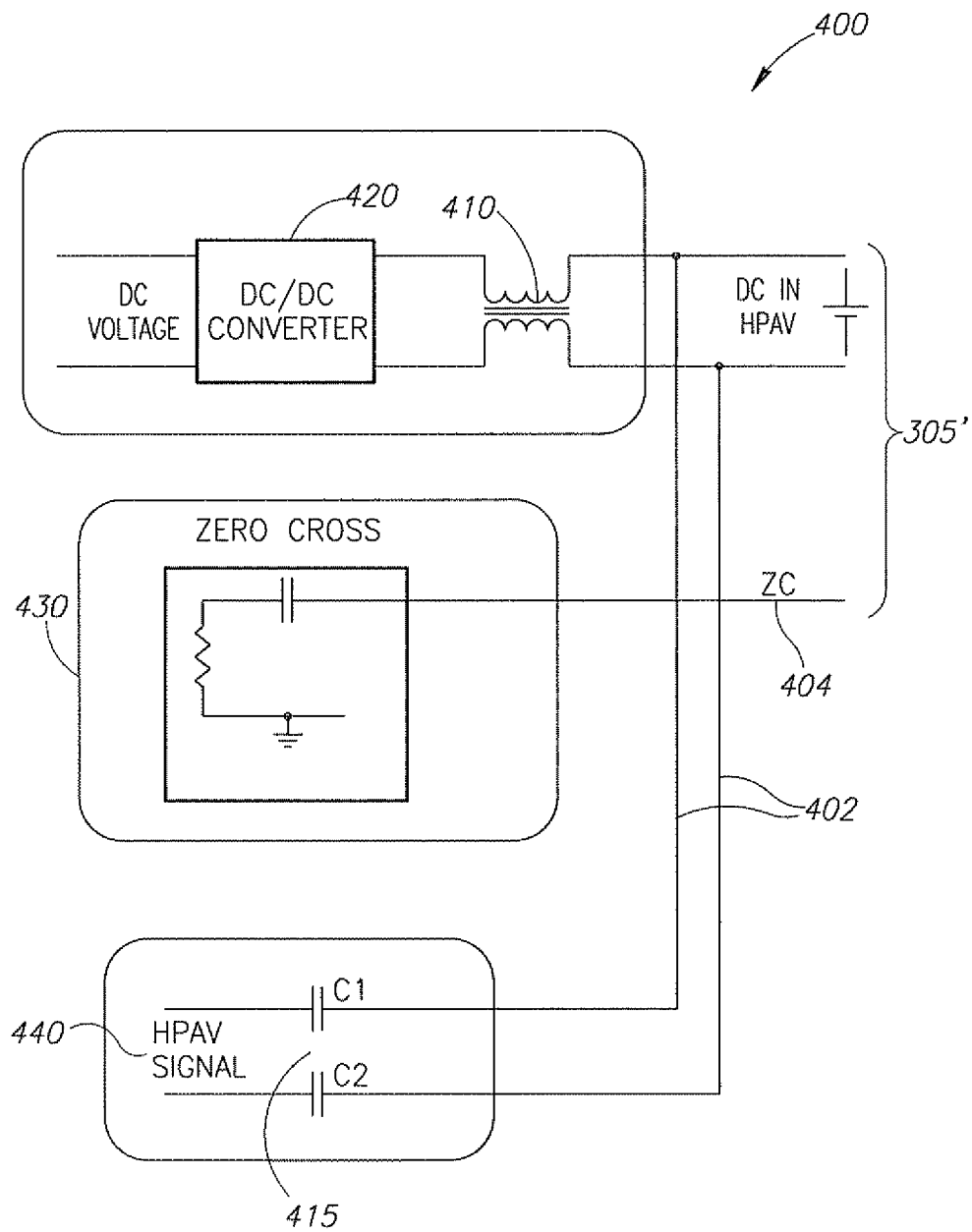
FIG. 14 is a schematic illustration of an exemplary electrical wiring diagram for the power unit of FIG. 13.

FIG. 14, to which reference is now made, illustrates an exemplary wiring diagram for the embodiment of FIG. 13; like numerals may refer to similar elements in both figures. Triple wire wiring 305' may provide input from an external power supply. It will be appreciated that wiring 305' may comprise single pair wiring 406 with DC/AC HPAV signals and single wire 404 with standard AC signals suitable for zero cross detection. Single pair wiring 402 may split off from wiring 406 to provide input to high pass filter 415; allowing high frequency HPAV signals 440 to proceed to unit 450 (not shown).

Signals from wiring 406 may also pass through low frequency filter 410. Unlike the embodiment of FIG. 8, single wire 404 may provide input directly to zero cross detection unit 430 without passing through a filter. Unit 430 may process the input signal as necessary to provide input to main embedded unit 450 (not shown).

Figure 15A:
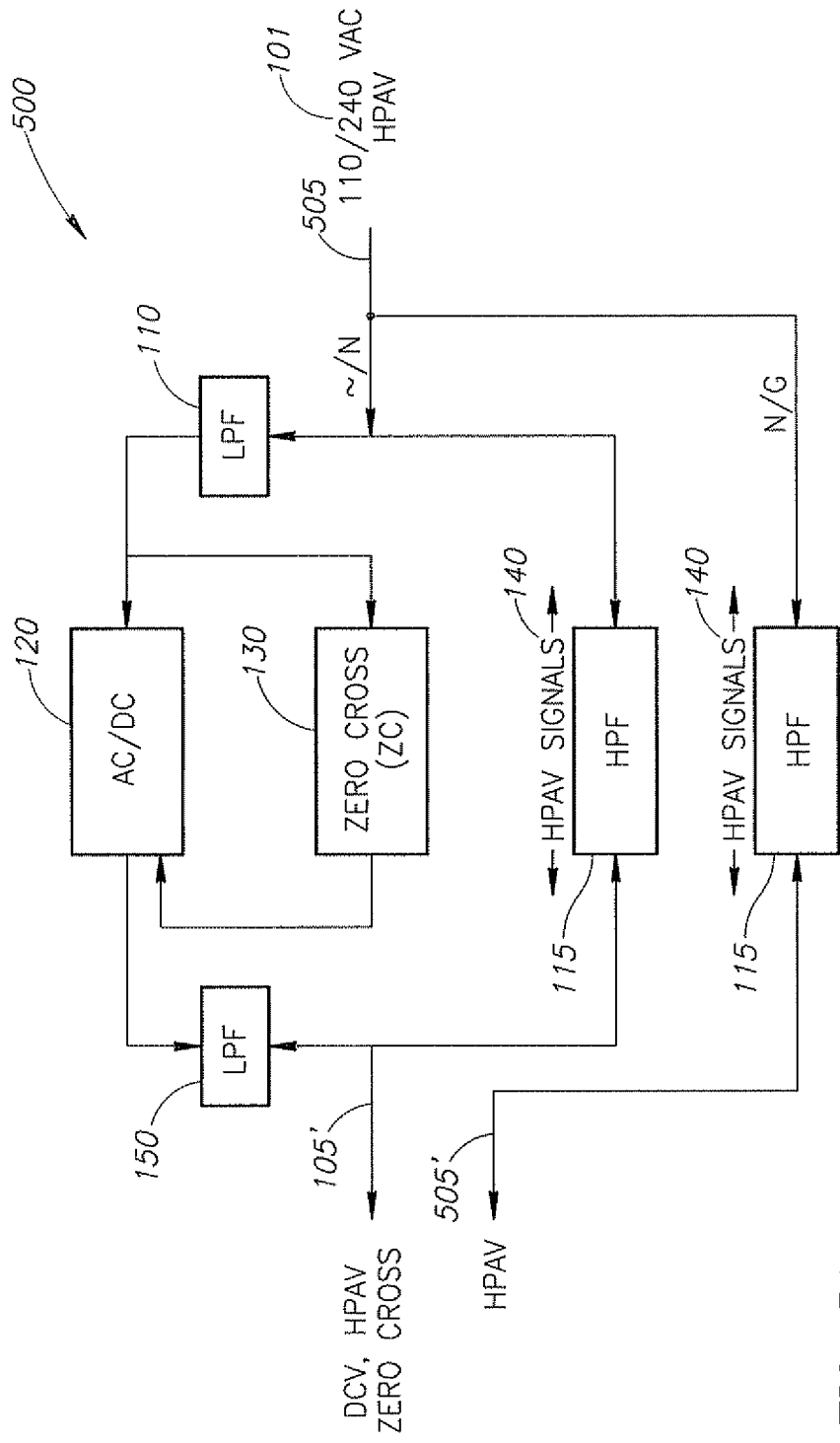
FIG. 15 are schematic illustrations of novel triple prong power units, constructed and operative in accordance with preferred embodiments of the present invention.

It will be appreciated that a disadvantage of HPAV networks may be that they are subject to ongoing interference from electrical appliances and the like that may share the powerline medium. In accordance with a preferred embodiment of the present invention, three prong input from the powerline may also be leveraged to provide redundant data streams to facilitate error recovery in such a noisy environment. Reference is now made to FIG. 15A which illustrates a block diagram for a novel triple wire input power unit for a powerline STB 500, constructed and operative in accordance with a preferred embodiment of the present invention.

Power unit 500 may be similar to power unit 100 as depicted in FIG. 1, comprising an AC/DC converter unit 120 and low pass filters 110 and 150, and zero cross unit 130. However, power unit 500 may comprise two high pass filters 115. Triple wire input wiring 505 may carry standard 110/240 VAC voltage (including HPAV signals) from the electric mains. The phase and neutral wires may be paired and processed in a similar manner as in system 100 to produce output wiring 105'. However, a neutral/ground pairing may be branched off of wiring 505 and input to the second HPF 515 without further processing. Accordingly, system 500 may interface with an STB via wiring 105' as per the embodiment of FIG. 1, but may also communicate with the STB via wiring 505'. Accordingly, system 500 may be capable of providing additional and/or redundant HPAV signals when compared to system 100.

Figure 15B:
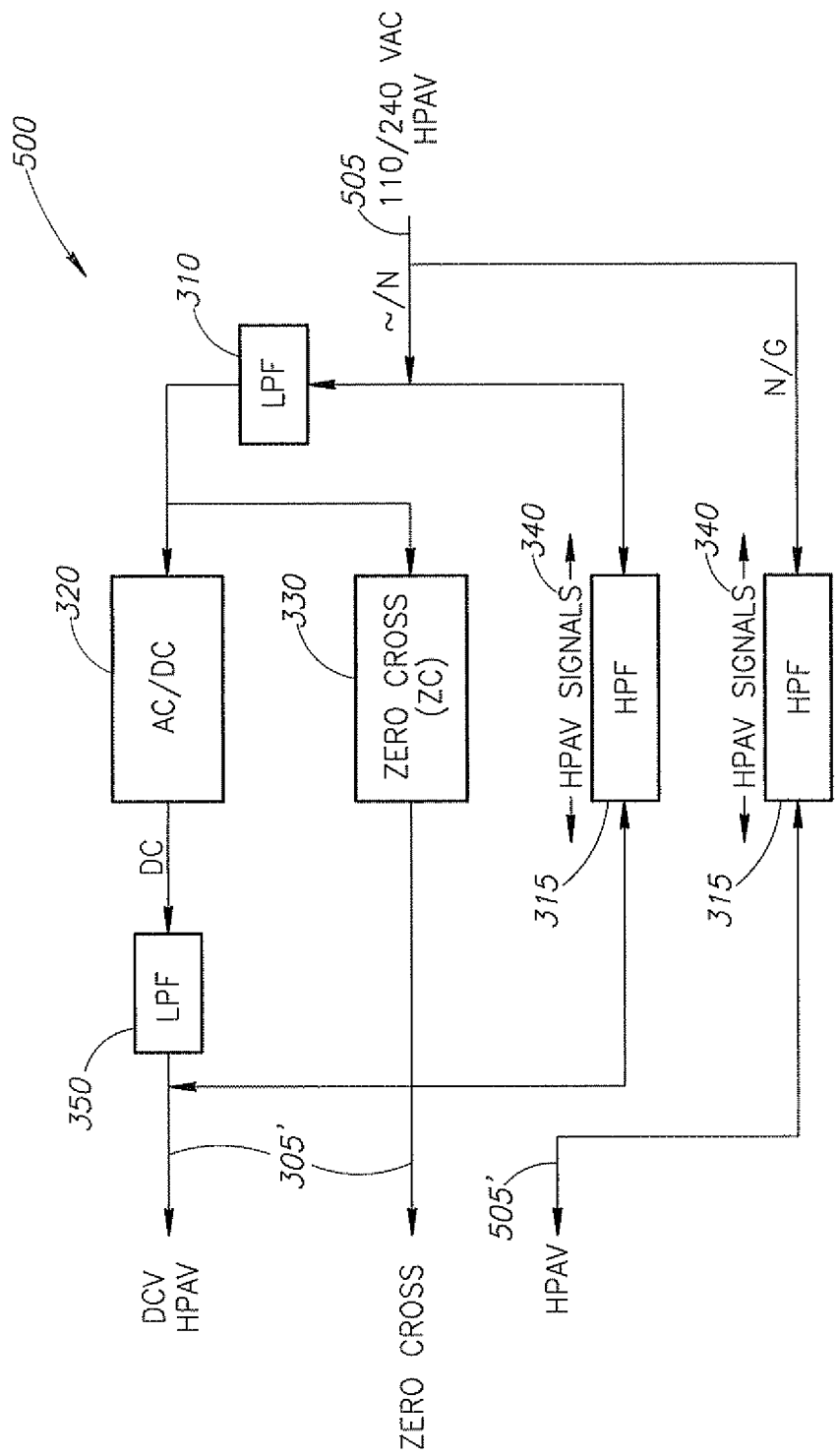

Reference is now made also to FIG. 15B which also illustrates a block diagram for a novel triple wire input power unit for a powerline STB 500, constructed and operative in accordance with a preferred embodiment of the present invention. The embodiment of FIG. 15B may be generally similar to that of FIG. 15A. However, instead of adding wiring 505' to wiring 105' to interface with the STB, wiring 305' as detailed in the embodiment of FIG. 11 may be used. Accordingly, the embodiment of FIG. 15B may differ from that of FIG. 15A in that it may provide zero cross indications to the STB on a dedicated wire.

Figure 16:
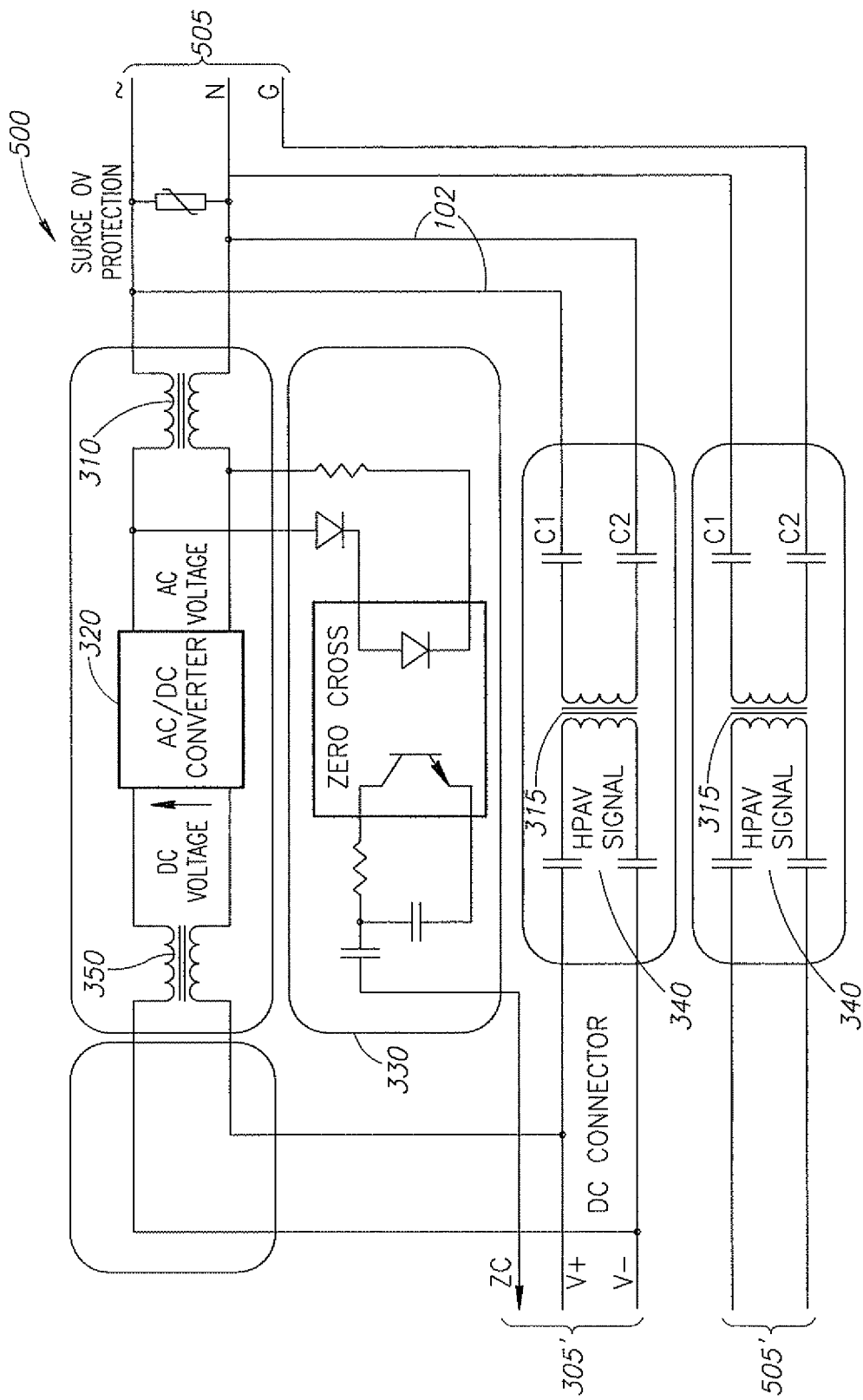
FIG. 16 is a schematic illustration of an exemplary electrical wiring diagram for the power unit of FIG. 15B.

FIG. 16, to which reference is now made, illustrates an exemplary wiring diagram for the embodiment of FIG. 15B; like numerals may refer to similar elements in both figures. Triple prong input wiring 505 may carry AC current from the electric mains. In accordance with a preferred embodiment of the present invention, a phase neutral pairing of wires may be processed in generally the same manner as in system 300 to produce wiring 305', wherein one wire may be dedicated to carrying zero cross indications. In accordance with a preferred embodiment of the present invention, the neutral and ground wires may be branched in a second pairing and input to a second HPF 315, yielding HPAV signals 340 which may be output on wiring 505' in addition to the signals on wiring 305'. In such manner, system 500 may provide redundant and/or additional HPAV signals when compared with the previous embodiments.

It will be appreciated that with the exception of the provision of a dedicated line for zero cross indications, an exemplary wiring diagram for embodiment of FIG. 15A may be generally similar to that of FIG. 16.

It will also be appreciated that the disclosure of phase/neutral and neutral/ground pairings may be exemplary; the present invention may include any of the possible combinations for pairing ground, neutral and phase wires. It will further be appreciated that as in the previous embodiments, the HPAV signals transmitted by system may be bidirectional, moving towards and away from the STB.

Figure 17:
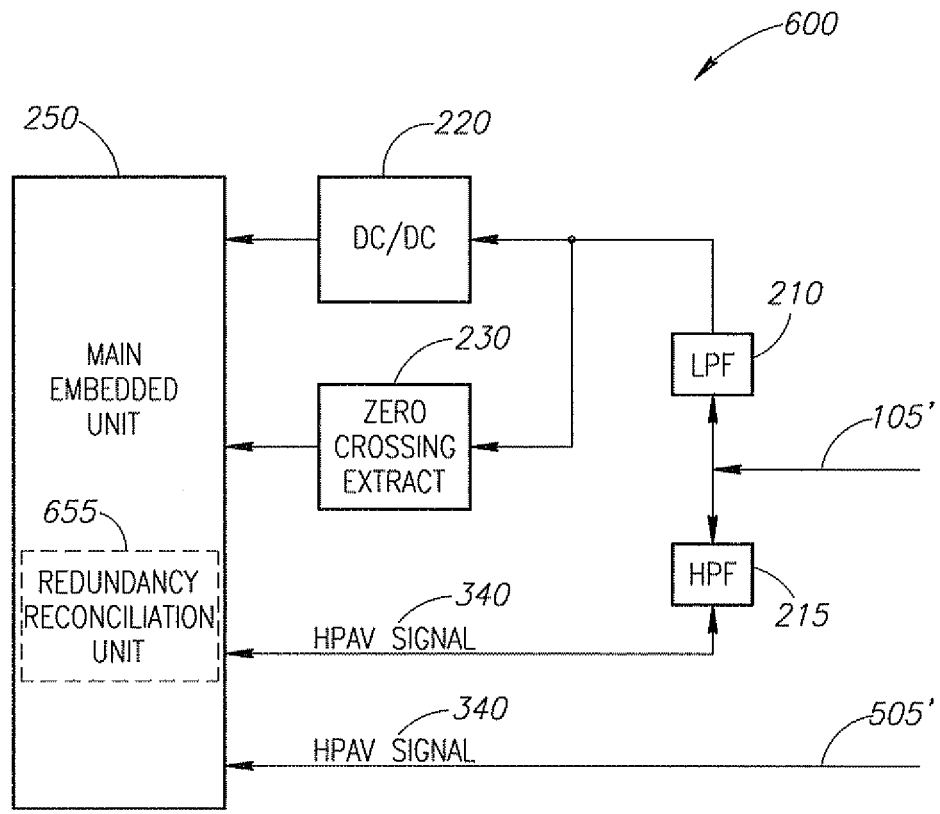
FIG. 17 is a schematic illustration of a novel embedded power unit to communicate with the power unit of FIG. 15B.

FIG. 17, to which reference is now made, illustrates a block diagram for a novel embedded unit 600 to communicate with the embodiment of FIG. 15A, constructed and operative in accordance with a preferred embodiment of the present invention. Similar to units 200 and 400, unit 600 may comprise main embedded unit 250 to provide STB functionality. Unit 600 may also comprise DC/DC power supply 220 and zero cross extractor 230. It will be appreciated that the implementation of unit 600 providing STB functionality may be exemplary. The present invention may also include unit 600 providing other relevant functionality, such as, for example, an HPAV network adapter.

Similar to system 200, input wiring 105' may carry DC, HPAV signals and zero crossing information which may be filtered by LPF 210 and HPF 215 prior to further processing as disclosed in previous embodiments 200 and 400. Unlike system 200, unit 250 may also receive HPAV signals directly via wiring 505'. It will be appreciated that as the signals on wiring 505' may already have passed through a high pass filter in system 500, there may be no need for further filtering in system 600.

It will be appreciated that unit 600 may be configured in accordance with the configuration of unit 500. Accordingly, unit 600 may also be configured in a generally similar manner to unit 400 in order to accommodate processing zero cross indications on a dedicated wire if system 500 may be configured in accordance with the embodiment of FIG. 15B.

In accordance with a preferred embodiment of the present invention, unit 250 may comprise redundancy reconciliation unit 655 to reconcile discrepancies between redundant HPAV signals that may be received via wiring 105' and 505'.

It will be appreciated that unit 650 may both receive and transmit HPAV signals 340. Accordingly, as in the previous embodiments, HPAV signals 340 may be transmitted bidirectionally along wiring 105' and 505'.

It will also be appreciated that the filters architecture and electrical requirements of disclosed for the single pair wiring embodiments in FIGS. 3-6, 9 and 10 may be generally the same for the three prong wire embodiments. However, it may be highly recommended to use either a shielded wire or twisted wire for the Zero Cross dedicated wire.

When implementing the triple wire embodiments as disclosed hereinabove, in order to increase throughput speed it may be preferable to use Phase/Neutral and Neutral/Ground pairs for the HPAV/G.hn signals. It will be appreciated, however, that Phase/Ground may also be used. In fact, as discussed hereinabove, any possible pairing may be used.

It will be appreciated that the present invention may be applicable for any technology that communicates over power wires, such as HPAV and its flavors, HD-PLC, UPA, Smart grid related technologies, G.hn, etc.

It will also be appreciated that units 100, 200, 300, 400, 500 and 600 as configured in the hereinabove disclosed embodiments may be exemplary. The present invention may also include other possible configurations for the placement of some or all of the described functionality in an external power unit, the STB and/or a third unit.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A power unit for use with a powerline communication device comprising:
   an AC/DC converter to at least convert VAC input to DC;
   a zero cross unit for generating a zero-crossing signal which is input to said AC/DC converter to modulate output from said AC/DC converter according to zero crossings in said VAC input; and
   at least one high pass filter (HPF) to filter said VAC input and to pass powerline data signals received on a same medium from which said VAC input is received;
   wherein an output signal from the power unit to the powerline communication device is a combination of said modulated output from said AC/DC converter and said powerline data signals passed through said HPF.

2. The power unit according to claim 1 and wherein said power unit is housed in an external unit connectable to an embedded unit capable of processing said data signals.

3. The power unit according to claim 2 and wherein said embedded unit is at least one of a set top box (STB) and a gateway.

4. The power unit according to claim 1 and wherein:
   at least one of said AC/DC converter, said zero cross unit and said high pass filter are housed in a device comprising means for processing said data signals; and
   at least one of said AC/DC converter, said zero cross unit and said high pass filter are located external to said device.

5. The power unit according to claim 1 and wherein said data signals are one of HPAV and G.hn signals.

6. The power unit according to claim 1 and also comprising at least one low pass filter to facilitate input of low frequency AC signals to at least one of said AC/DC converter and said zero cross isolation unit.

7. The power unit according to claim 1 and also comprising:
   a triple wire input to receive said VAC input and said powerline data signals, wherein a first combination of two wires of said triple wire input are branched to provide input to said AC/DC converter and said at least one HPF; a second HPF to filter said VAC input and to pass said powerline data signals received from a second combination of two wires branched from said triple wire input;

a first single pair wiring to output said output signal to the powerline communication device; and a second single pair wiring to output at least said passed powerline data signals from said second HPF to the powerline communication device.

8. A power unit for use with a powerline communication device comprising:

an AC/DC converter to at least convert VAC input to DC;

a zero cross unit to detect zero crossings in said VAC input; and at least one high pass filter (HPF) to filter said VAC input and to pass powerline data signals received on a same medium from which said VAC input is received;

a single pair wiring to output an output signal to the powerline communication device, said output signal a combination of said DC from said AC/DC converter and said powerline data signals passed through said HPF; and a third wire to output an indicator signal associated with said detected zero crossings to the powerline communication device, said third wire suitable to be wrapped together with said single pair in a triple wire interface.

9. The power unit according to claim 8 and also comprising:

a triple wire input to receive said VAC input and said powerline data signals, wherein a first combination of two wires of said triple wire input are branched to provide input to said AC/DC converter and said at least one HPF;

a second HPF to filter said VAC input and to pass said powerline data signals received from a second combination of two wires branched from said triple wire input; and a second single pair wiring to output at least said passed powerline data signals from said second HPF to the powerline communication device.

10. The power unit according to claim 9 and wherein said embedded unit is at least one of a set top box (STB) and a gateway.

11. The power unit according to claim 8 and wherein the power unit is housed in an external unit connectable to an embedded unit capable of processing said data signals.

12. The power unit according to claim 8 and wherein:

at least one of said AC/DC converter, said zero cross unit and said at least high pass filter are housed in a device comprising means for processing said data signals; and at least one of said AC/DC converter, said zero cross unit and said high pass filter are located external to said device.

13. The power unit according to claim 8 and wherein said data signals are one of HPAV and G.hn signals.

14. The power unit according to claim 8 and also comprising at least one low pass filter to facilitate input of low frequency AC signals to at least one of said AC/DC converter and said zero cross unit.

15. A method for providing power and data signals from a single powerline source, the method comprising:

receiving incoming VAC in an external power unit;

converting said incoming VAC to DC with an AC/DC converter;

modulating said DC by said AC/DC converter responsive to a zero-crossing signal input to said AC/DC converter, said zero-crossing signal associated with zero crossings from said incoming VAC;

filtering said incoming VAC to at least isolate powerline data signals, wherein said powerline data signals are received on a same medium from which said incoming VAC is received;

combining said modulated DC and said powerline data signals in an output signal; and providing said output signal to an embedded processing unit capable of processing said powerline data signals.

16. The method according to claim 15 and wherein at least one of said converting, said modulating and said filtering is performed in an external power unit.

17. The method according to claim 15 and wherein at least one of said converting, said modulating and said filtering is performed in said processing unit.

18. A method for providing power and data signals from a single powerline source, the method comprising:

receiving incoming VAC in an external power unit;

converting said incoming VAC to DC;

filtering said incoming VAC to at least isolate powerline data signals, wherein said powerline data signals are received on a same medium from which said incoming VAC is received;

detecting zero crossings in said incoming VAC;

combining said DC and said received powerline data signals in an output signal for transmitting over a single pair wiring;

outputting an indicator signal associated with said detected zero crossings in a third wire suitable to be wrapped together with said single pair wire in a triple wire interface; and providing said output signal and said indicator signal to an embedded processing unit capable of processing said powerline data signals.

19. The method according to claim 18 and wherein at least one of said converting, said modulating and said filtering is performed in an external power unit.

20. The method according to claim 18 and wherein at least one of said converting, said modulating and said filtering is performed in said processing unit.

* * * * *